United States Patent
Crandall et al.

(10) Patent No.: US 9,389,742 B2
(45) Date of Patent: Jul. 12, 2016

(54) CAPACITIVE TOUCH DEVICE, CAPACITIVE COMMUNICATION DEVICE AND COMMUNICATION SYSTEM

(71) Applicant: PIXART IMAGING INC., Hsin-Chu County (TW)

(72) Inventors: Ken Crandall, Santa Clara, CA (US);
Chung-Wen Lo, Santa Clara, CA (US);
David Touney, Santa Clara, CA (US);
Tom Murphy, Santa Clara, CA (US);
Hsin-Chia Chen, Santa Clara, CA (US)

(73) Assignee: Pixart Imaging Inc., Hsin-Chu County (TW)

(*) Notice: Subject to any disclaimer, the term of this patent is extended or adjusted under 35 U.S.C. 154(b) by 21 days.

(21) Appl. No.: 14/565,622

(22) Filed: Dec. 10, 2014

(65) Prior Publication Data
US 2016/0170516 A1     Jun. 16, 2016

(51) Int. Cl.
*G06F 3/045* (2006.01)
*G06F 3/044* (2006.01)

(52) U.S. Cl.
CPC .................................. *G06F 3/044* (2013.01)

(58) Field of Classification Search
CPC ...... G06F 3/041; G06F 3/0412; G06F 3/0416; G06F 3/044; G09G 2370/00
See application file for complete search history.

(56) References Cited

U.S. PATENT DOCUMENTS

| | | | | |
|---|---|---|---|---|
| 6,452,514 B1* | 9/2002 | Philipp | ................ | G01D 5/2405 178/18.06 |
| 8,232,977 B2* | 7/2012 | Zachut | ................. | G06F 3/0418 345/173 |
| 8,633,715 B2 | 1/2014 | Lenz | | |
| 8,854,925 B1* | 10/2014 | Lee | ...................... | G04G 9/0005 368/10 |
| 2010/0013773 A1* | 1/2010 | Ku | ...................... | G06F 3/03545 345/168 |
| 2010/0096193 A1* | 4/2010 | Yilmaz | ................... | G06F 3/044 178/18.06 |
| 2014/0171055 A1* | 6/2014 | Oshita | .................... | H04W 4/12 455/418 |
| 2014/0204046 A1* | 7/2014 | Hsu | ........................ | G06F 3/044 345/174 |
| 2014/0243046 A1* | 8/2014 | Steely | ................. | G06F 21/6254 455/566 |
| 2015/0193335 A1* | 7/2015 | Woo | ....................... | G06F 12/023 711/171 |
| 2015/0268758 A1* | 9/2015 | Lo | ......................... | G06F 3/0416 345/174 |
| 2015/0339524 A1* | 11/2015 | Yang | .................. | G06K 9/00402 382/189 |
| 2015/0351681 A1* | 12/2015 | Lee | ..................... | A61B 5/4806 600/595 |
| 2016/0034887 A1* | 2/2016 | Lee | ........................ | G09G 5/12 705/39 |
| 2016/0039424 A1* | 2/2016 | Hong | ................... | B60W 40/08 701/2 |
| 2016/0046285 A1* | 2/2016 | Kim | ...................... | B60W 30/00 340/932.2 |

* cited by examiner

Primary Examiner — Joe H Cheng
(74) Attorney, Agent, or Firm — Rosenberg, Klein & Lee

(57) ABSTRACT

There is provided a capacitive touch device including a touch panel, a detection circuit and a processing unit. The touch panel includes a plurality of drive electrodes and a plurality of receiving electrodes configured to form a coupling electric field with an external touch panel, and the receiving electrodes are respectively configured to output a detection signal. The detection circuit is coupled to one of the receiving electrodes and configured to modulate the detection signal with two signals to generate two detection components. The processing unit is configured to obtain a phase value according to the two detection components to accordingly decode transmission data.

20 Claims, 10 Drawing Sheets

CAPACITIVE TOUCH DEVICE, CAPACITIVE COMMUNICATION DEVICE AND COMMUNICATION SYSTEM

BACKGROUND

1. Field of the Disclosure

This disclosure generally relates to an interactive input device and, more particularly, to a capacitive touch device, a capacitive communication device and a communication system.

2. Description of the Related Art

Capacitive sensors generally include a pair of electrodes configured to sense a finger. When a finger is present, the amount of charge transferring between the pair of electrodes can be changed so that it is able to detect whether the finger is present or not according to a voltage variation. It is able to form a sensing matrix by arranging a plurality of electrode pairs in matrix.

FIGS. 1A and 1B are schematic diagrams of a conventional capacitive sensor which includes a first electrode 91, a second electrode 92, a drive circuit 93 and a detection circuit 94. The drive circuit 93 is configured to input a drive signal to the first electrode 91. Electric field can be formed between the first electrode 91 and the second electrode 92 so as to transfer charges to the second electrode 92. The detection circuit 94 is configured to detect the amount of charges transferred to the second electrode 92.

When a finger is present, e.g. shown by an equivalent circuit 8, the finger may disturb the electric field between the first electrode 91 and the second electrode 92 so that the amount of transferred charges is reduced. The detection circuit 94 can detect a voltage variation to accordingly identify the presence of the finger.

In addition, when another capacitive sensor approaches, the electric field between the first electrode 91 and the second electrode 92 is also changed thereby changing the amount of transferred charges. The detection circuit 94 is also able to detect a voltage variation to accordingly identify the presence of said another capacitive sensor.

SUMMARY

Accordingly, the present disclosure provides a capacitive touch device, a capacitive communication device and a communication system capable of detecting the touch event as well as performing the near field communication.

The present disclosure provides a capacitive touch device, a capacitive communication device and a communication system that may identify the touch event according to the variation of a norm of vector of two detection components and perform the near field communication according to the phase variation of detection signals.

The present disclosure further provides a capacitive touch device, a capacitive communication device and a communication system that have a longer transmission distance.

The present disclosure provides a capacitive touch device including a touch panel, a detection circuit and a processing unit. The touch panel includes a plurality of drive electrodes and a plurality of receiving electrodes configured to form a coupling electric field with an external touch panel, and the receiving electrodes are respectively configured to output a detection signal according to the coupling electric field. The detection circuit is coupled to one of the receiving electrodes and configured to modulate the detection signal respectively with two signals to generate two detection components. The processing unit is configured to obtain a norm of vector according to the two detection components to accordingly identify a touch event and obtain a phase value according to the two detection components to accordingly decode transmission data.

The present disclosure further provides a communication system including a first touch panel and a second touch panel. The second touch panel includes a plurality of drive electrodes, a plurality of receiving electrodes, a second drive circuit, a second detection circuit and a second processing unit. The drive electrodes and the receiving electrodes are configured to form a coupling electric field with the first touch panel, and the receiving electrodes are respectively configured to output a second detection signal according to the coupling electric field. The second drive circuit is coupled to one of the drive electrodes and configured to output a phase-fixed drive signal or a phase-modulated drive signal to the drive electrode coupled thereto. The second detection circuit is coupled the receiving electrode associated with the drive electrode coupled to the second drive circuit and configured to modulate the second detection signal respectively with two signals to generate two detection components. The second processing unit is configured to obtain a norm of vector according to the two detection components to accordingly identify a touch event.

The present disclosure further provides a capacitive communication device including at least one receiving electrode, a detection circuit and a processing unit. The at least one receiving electrode is configured as a receiving antenna and configured to form a coupling electric field with an external electric field, and the receiving electrode is configured to output a detection signal according to the coupling electric field. The detection circuit is coupled to the at least one receiving electrode and configured to modulate the detection signal respectively with two signals to generate two detection components. The processing unit is configured to obtain a phase value according to the two detection components to accordingly decode transmission data.

In the capacitive touch device, capacitive communication device and communication system according to some embodiments of the present disclosure, the phase-modulated drive signal may be a phase-shift keying (PSK) signal or a differential phase shift keying (DPSK) signal. The PSK signal may be a biphase shift keying (BPSK) signal, a quadrature phase shift keying (QPSK) signal, an 8-PSK signal or a 16-PSK signal. The DPSK signal may be a differential BPSK (DBPSK) signal, a differential QPSK (DQPSK) signal, a differential 8PSK (D-8PSK) signal or a differential 16PSK (D-16PSK) signal.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
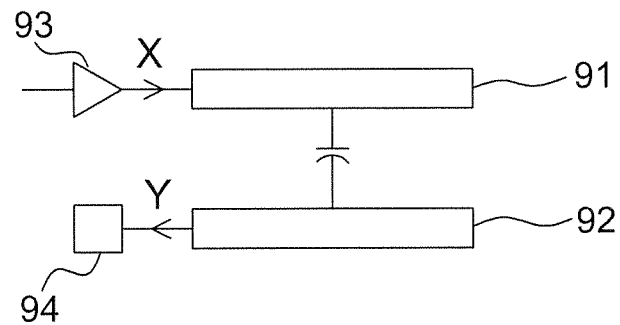
FIGS. 1A-1B are schematic block diagrams of the conventional capacitive sensor.
Figure 1B:
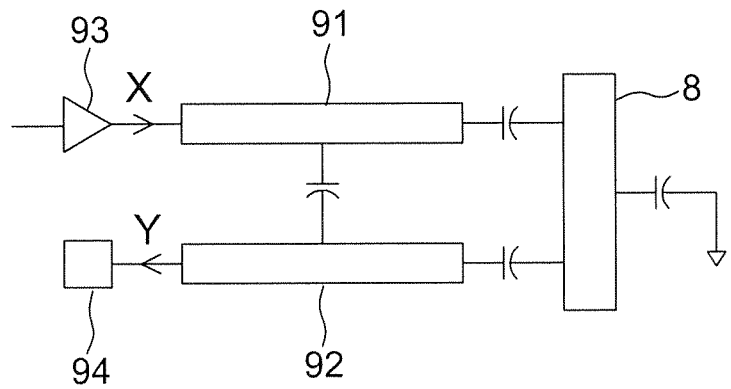
Figure 2:
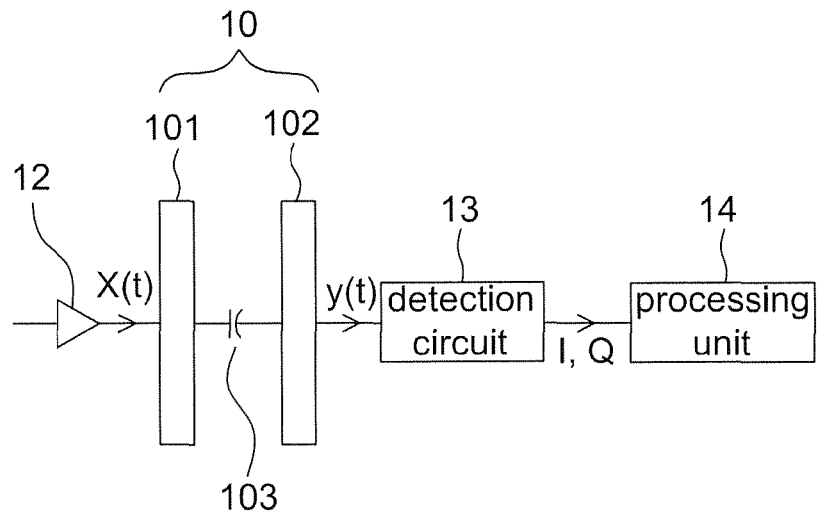
FIG. 2 is a schematic diagram of the capacitive touch sensing device according to one embodiment of the present disclosure.

Referring to FIG. 2, it shows a schematic diagram of the capacitive touch sensing device according to an embodiment of the present disclosure. The capacitive touch sensing device of this embodiment includes a sensing element 10, a drive unit 12, a detection circuit 13 and a processing unit 14. The capacitive touch sensing device is configured to detect whether an object (e.g. a finger or a metal plate, but not limited to) approaches the sensing element 10 according to the change of the amount of charges on the sensing element 10.

The sensing element 10 includes a first electrode 101 (e.g. a drive electrode) and a second electrode 102 (e.g. a receiving electrode), and electric field can be produced to form a coupling capacitance 103 between the first electrode 101 and the second electrode 102 when a voltage signal is inputted to the first electrode 101. The first electrode 101 and the second electrode 102 may be arranged properly without any limitation as long as the coupling capacitance 103 can be formed (e.g. via a dielectric layer), wherein principles of forming the electric field and the coupling capacitance 103 between the first electrode 101 and the second electrode 102 is well know and thus are not described herein. The present disclosure is to eliminate the interference on detecting results due to the phase shift caused by the capacitance on signal lines.

The drive unit 12 may be a signal generator and configured to input a drive signal x(t) to the first electrode 101 of the sensing element 10. The drive signal x(t) may be a time-varying signal, such as a periodic signal. In other embodiments, the drive signal x(t) may be a meander signal (e.g. a sinusoidal signal) or a pulse signal (e.g. a square wave), but not limited thereto. The drive signal x(t) may couple a detection signal y(t) on the second electrode 102 through the coupling capacitance 103.

The detection circuit 13 is coupled to the second electrode 102 of the sensing element 10 and configured to detect the detection signal y(t) and to modulate the detection signal y(t) respectively with two signals so as to generate a pair of modulated detection signals, which are served as two components I and Q of a two-dimensional detection vector. The two signals may be continuous signals or vectors that are orthogonal or non-orthogonal to each other. In one aspect, the two signals include a sine signal and a cosine signal, i.e. the two signals preferably have different phases.

The processing unit 14 is configured to calculate an amplitude of the pair of the modulated detection signals, which is served as a norm of vector of the two-dimensional detection vector (I,Q), and to compare the norm of vector with a threshold TH so as to identify a touch event. In one aspect, the processing unit 14 may calculate the norm of vector $R=\sqrt{I^2+Q^2}$ by using software. In other aspect, the processing unit 14 may calculate by hardware or firmware, such as using the CORDIC (coordinate rotation digital computer) shown in FIG. 4 to calculate the norm of vector $R=\sqrt{i^2+q^2}$, wherein the CORDIC is a well known fast algorithm. For example, when there is no object closing to the sensing element 10, the norm of vector calculated by the processing unit 14 is assumed to be R; and when an object is present nearby the sensing element 10, the norm of vector is decreased to R'. When the norm of vector R' is smaller than the threshold TH, the processing unit 14 may identify that the object is present close to the sensing element 10 and induces a touch event. It should be mentioned that when another object, such as a metal plate, approaches the sensing element 10, the norm of vector R may be increased. Therefore, the processing unit 14 may identify a touch event occurring when the norm of vector becomes larger than a predetermined threshold.

In another embodiment, the processing unit 14 may perform coding on the two components I and Q of the two-dimensional detection vector by using quadrature amplitude-shift keying (QASK), such as 16-QASK. A part of the codes may be corresponded to the touch event and the other part of the codes may be corresponded to non-touch state and these codes are previously saved in the processing unit 14. When the processing unit 14 calculates the QASK code of two current components I and Q according to the pair of the modulated detection signals, it is able to identify that whether an object is present near the sensing element 10.

Figure 3A:
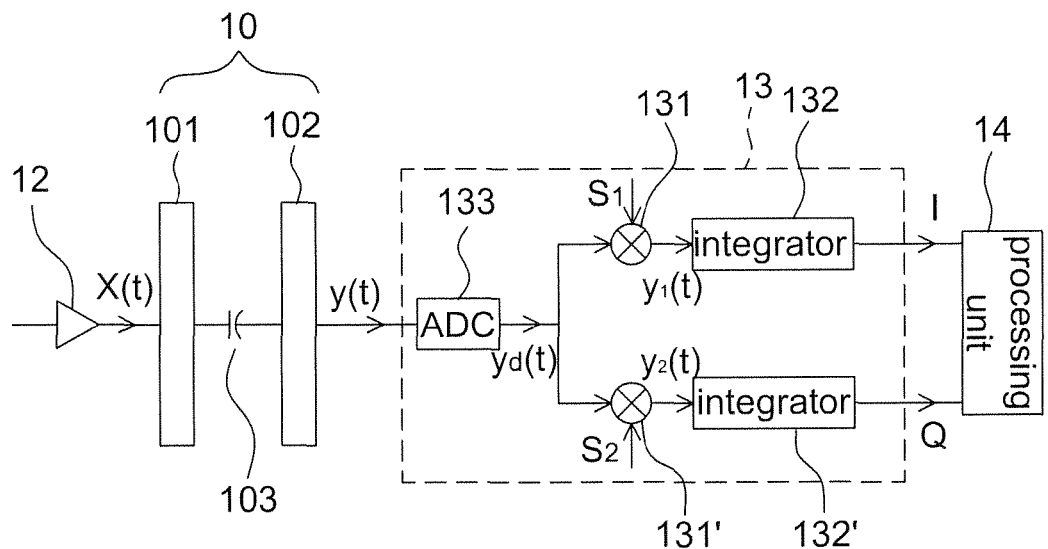
FIGS. 3A-3B are other schematic diagrams of the capacitive touch sensing device according to some embodiments of the present disclosure.
Figure 3B:
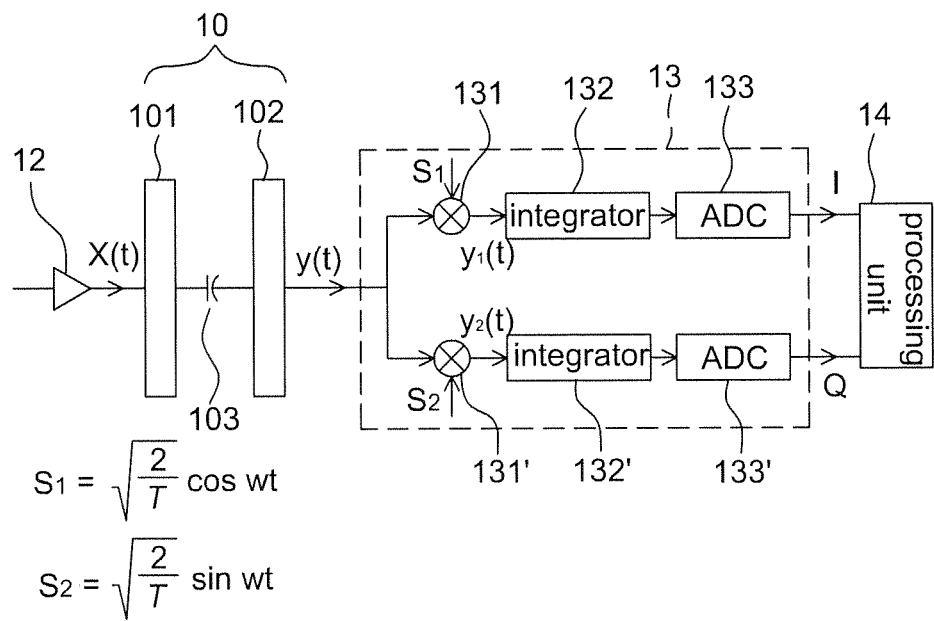

FIGS. 3A and 3B respectively show another schematic diagram of the capacitive touch sensing device according to an embodiment of the present disclosure in which embodiments of the detection circuit 13 are shown.

In FIG. 3A, the detection circuit 13 includes two multipliers 131 and 131', two integrators 132 and 132', an analog-to-digital converter (ADC) 133, and is configured to process the detection signal y(t) so as to generate a two-dimensional detection vector (I,Q). The ADC converter 133 is configured to digitize the detection signal y(t) to generate a digitized detection signal $y_d(t)$. The two multipliers 131 and 131' are indicated to modulate two signals $S_1$ and $S_2$ with the digitized detection signal $y_d(t)$ so as to generate a pair of modulated detection signals $y_1(t)$ and $y_2(t)$. In order to sample the pair of modulated detection signals $y_1(t)$ and $y_2(t)$, two integrators 132 and 132' are configured to integrate the pair of modulated detection signals $y_1(t)$ and $y_2(t)$ so as to generate two digital components I and Q of the two-dimensional detection vector (I,Q). In this embodiment, the two integrators 132 and 132' may be any proper integration circuit, such as the capacitor.

In FIG. 3B, the detection circuit 13 includes two multipliers 131 and 131', two integrators 132 and 132', two analog-to-digital converters (ADC) 133 and 133' configured to process the detection signal y(t) so as to generate a two-dimensional detection vector (I,Q). The two multipliers 131 and 131' are indicated to modulate two signals, such as $S_1=\sqrt{2/T}\cos(\omega t)$ and $S_2=\sqrt{2/T}\sin(\omega t)$ herein, with the detection signal y(t) so as to generate a pair of modulated detection signals $y_1(t)$ and $y_2(t)$. In order to sample the pair of modulated detection signals $y_1(t)$ and $y_2(t)$, two integrators 132 and 132' are configured to integrate the pair of modulated detection signals $y_1(t)$ and $y_2(t)$. In this embodiment, the two integrators 132 and 132' may be any proper integration circuit, such as the capacitor. The two ADC 133 and 133' are configured to digitize the pair of modulated detection signals $y_1(t)$ and $y_2(t)$ being integrated so as to generate two digital components I and Q of the two-dimensional detection vector (I,Q). It is appreciated that the two ADC 133 and 133' start to acquire digital data when voltages on the two integrators 132 and 132' are stable.

In addition to the two continuous signals mentioned above may be used as the two signals, the two signals may also be two vectors, for example $S_1=[1\ 0\ -1\ 0]$ and $S_2=[0\ -1\ 0\ 1]$ so as to simplify the circuit structure. The two signals may be proper simplified vectors without any limitation as long as the used vectors may simplify the processes of modulation and demodulation.

As mentioned above, the detection method of the capacitive touch sensing device of the present disclosure includes the steps of: inputting a drive signal to a first electrode of a sensing element; modulating a detection signal coupled to a second electrode from the drive signal through a coupling capacitance respectively with two signals so as to generate a pair of modulated detection signals; and calculating a scale of the pair of modulated detection signals to accordingly identify a touch event.

Referring to FIG. 3A for example, the drive unit 12 inputs a drive signal x(t) to the first electrode 101 of the sensing element 10, and the drive signal x(t) may couple a detection signal y(t) on the second electrode 102 of the sensing element 10 through the coupling capacitance 103. Next, the ADC 133 digitizes the detection signal y(t) to generate a digitized detection signal $y_d(t)$. The detection circuit 13 respectively modulates the detection signal y(t) with two signals $S_1$ and $S_2$ to generate a pair of modulated detection signals $y_1(t)$ and $y_2(t)$, wherein the two signals may be two vectors $S_1=[1\ 0\ -1\ 0]$ and $S_2=[0\ -1\ 0\ 1]$ herein. The processing unit 14 calculates a scale of the pair of modulated detection signals $y_1(t)$ and $y_2(t)$ to accordingly identify a touch event, wherein the method of calculating the scale of the pair of modulated detection signals $y_1(t)$ and $y_2(t)$ may be referred to FIG. 4 and its corresponding descriptions. In addition, before calculating the scale of the pair of modulated detection signals $y_1(t)$ and $y_2(t)$, the integrator 132 and/or 132' may be used to integrate the pair of modulated detection signals $y_1(t)$ and $y_2(t)$ and then output the two digital components I and Q of the two-dimensional detection vector (I,Q).

Referring to FIG. 3B for example, the drive unit 12 inputs a drive signal x(t) to the first electrode 101 of the sensing element 10, and the drive signal x(t) may couple a detection signal y(t) on the second electrode 102 of the sensing element 10 through the coupling capacitance 103. Next, the detection circuit 13 respectively modulates the detection signal y(t) with two signals $S_1$ and $S_2$ to generate a pair of modulated detection signals $y_1(t)$ and $y_2(t)$. The processing unit 14 calculates a scale of the pair of modulated detection signals $y_1(t)$ and $y_2(t)$ to accordingly identify a touch event, wherein the method of calculating the scale of the pair of modulated detection signals $y_1(t)$ and $y_2(t)$ may be referred to FIG. 4 and its corresponding descriptions. In addition, before calculating the scale of the pair of modulated detection signals $y_1(t)$ and $y_2(t)$, the integrator 132 and/or 132' may be used to integrate the pair of modulated detection signals $y_1(t)$ and $y_2(t)$ and then the ADC 133 and/or 133' may be used perform the digitization so as to output the two digital components I and Q of the two-dimensional detection vector (I,Q).

Figure 5:
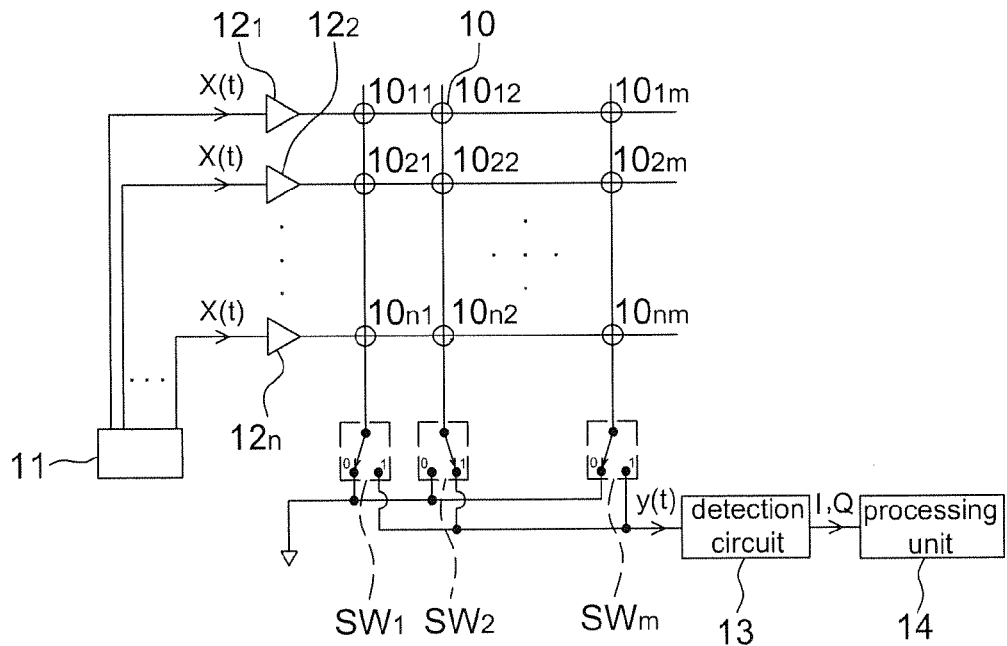
FIG. 5 is a schematic diagram of the capacitive touch sensing device according to another embodiment of the present disclosure.

Referring to FIG. 5, it shows a schematic diagram according to another embodiment of the present disclosure. A plurality of sensing elements 10 arranged in matrix may form a capacitive sensing matrix in which every row of the sensing elements 10 is driven by one of the drive units $12_1$-$12_n$ and the detection circuit 13 detects output signals of every column of the sensing elements 10 through one of the switch devices $SW_1$-$SW_m$. As shown in FIG. 5, the drive unit $12_1$ is configured to drive the first row of sensing elements $10_{11}$-$10_{1m}$; the drive unit $12_2$ is configured to drive the second row of sensing elements $10_{21}$-$10_{2m}$; . . . ; and the drive unit $12_n$ is configured to drive the nth row of sensing elements $10_{n1}$-$10_{nm}$; wherein, n and m are positive integers and the value thereof may be determined according to the size and resolution of the capacitive sensing matrix without any limitation.

In this embodiment, each of the sensing elements 10 (shown by circles herein) include a first electrode and a second electrode configured to form a coupling capacitance therebetween as shown in FIGS. 2, 3A and 3B. The drive units $12_1$-$12_n$ are respectively coupled to the first electrode of a row of the sensing elements 10. A timing controller 11 is configured to control the drive units $12_1$-$12_n$ to sequentially output a drive signal x(t) to the first electrode of the sensing elements 10.

The detection circuit 13 is coupled to the second electrode of a column of the sensing elements 10 through a plurality of switch devices $SW_1$-$SW_m$ to sequentially detect a detection signal y(t) coupled to the second electrode from the drive signal x(t) through the coupling capacitance of the sensing elements 10. The detection circuit 13 utilizes two signals to respectively modulate the detection signal y(t) to generate a pair of modulated detection signals, wherein details of generating the pair of modulated detection signals has been described in FIGS. 3A, 3B and their corresponding descriptions and thus are not repeated herein.

Figure 4:
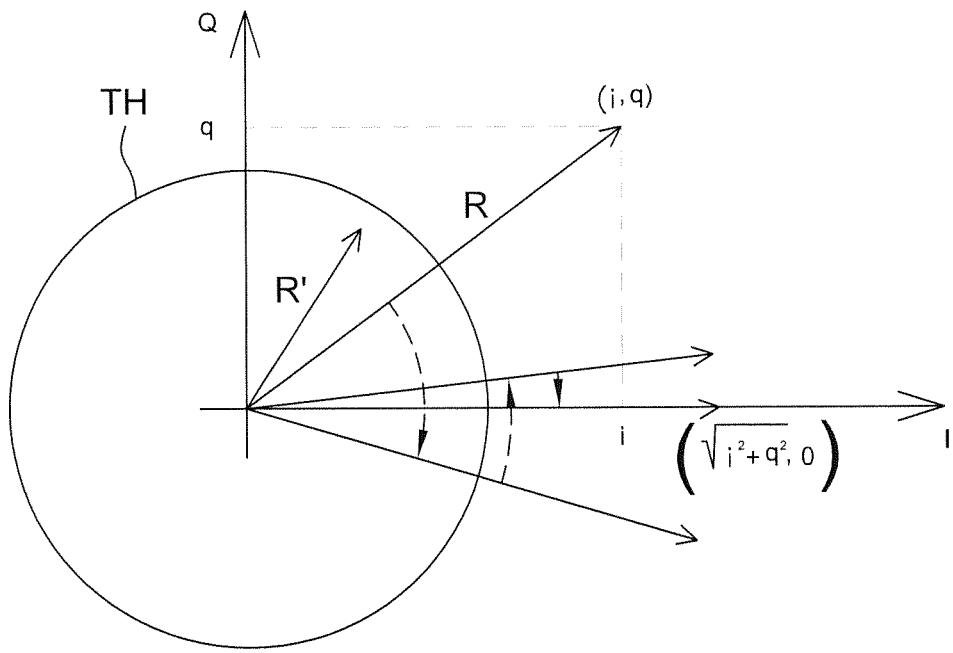
FIG. 4 is a schematic diagram of the norm of vector and the threshold used in the capacitive touch sensing device according to one embodiment of the present disclosure.

The processing unit 14 identifies a touch event and a touch position according to the pair of modulated detection signals. As mentioned above, the processing unit 14 may calculate a norm of vector of a two-dimensional detection vector of the pair of modulated detection signals and identifies the touch event when the norm of vector is larger than or equal to, or smaller than or equal to a threshold TH as shown in FIG. 4.

In this embodiment, when the timing controller 11 controls the drive unit $12_1$ to output the drive signal x(t) to the first row of the sensing elements $10_{11}$-$10_{1m}$, the switch devices $SW_1$-$SW_m$ are sequentially turned on such that the detection circuit 13 may detect the detection signal y(t) sequentially outputted by each sensing element of the first row of the sensing elements $10_{11}$-$10_{1m}$. Next, the timing controller 11 sequentially controls other drive units $12_2$-$12_n$ to output the drive signal x(t) to every row of the sensing elements. When the detection circuit 13 detects all of the sensing elements once, a scan period is accomplished. The processing unit 14 identifies the position of the sensing elements that the touch event occurs as the touch position. It is appreciated that said touch position may be occurred on more than one sensing elements 10 and the processing unit 14 may take all positions of a plurality of sensing elements 10 as touch positions or take one of the positions (e.g. the center or gravity center) of a plurality of sensing elements 10 as the touch position.

Figure 6:
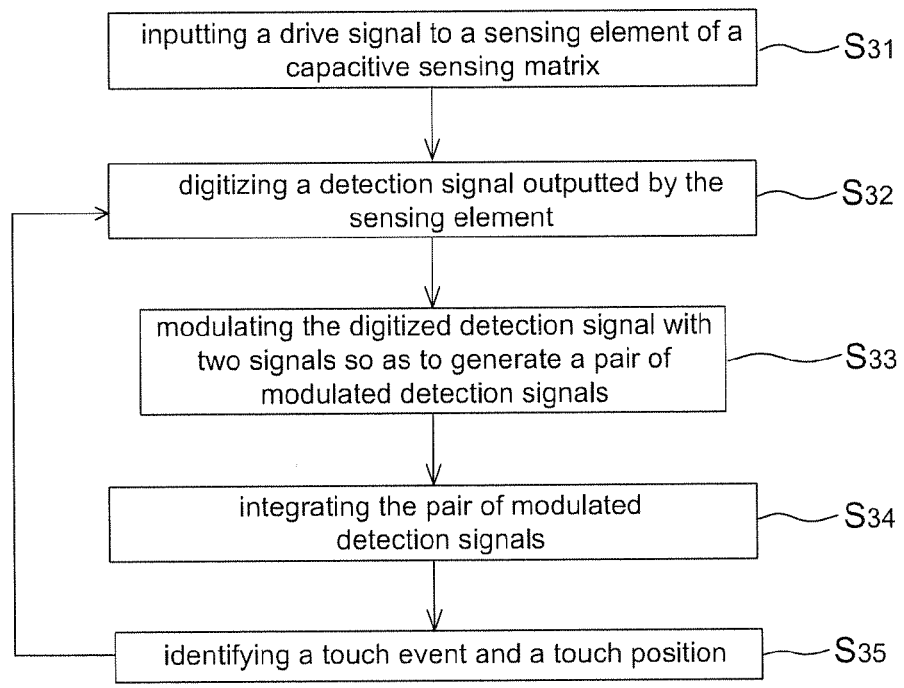
FIG. 6 is a flow chart of the operation of the capacitive touch sensing device shown in FIG. 5.

Referring to FIG. 6, it shows a flow chart of the operation of the capacitive sensing device shown in FIG. 5, which includes the steps of: inputting a drive signal to a sensing element of a capacitive sensing matrix (Step $S_{31}$); digitizing a detection signal outputted by the sensing element (Step $S_{32}$);

respectively modulating the digitized detection signal with two signals so as to generate a pair of modulated detection signals (Step $S_{33}$); integrating the pair of modulated detection signals (Step $S_{34}$); and identifying a touch event and a touch position (Step $S_{35}$). Details of the operation of this embodiment have been described in FIG. 5 and its corresponding descriptions and thus are not repeated herein.

In another aspect, in order to save the power consumption of the capacitive touch sensing device shown in FIG. 5, the timing controller 11 may control more than one drive units 12$_1$-12$_n$ to simultaneously output the drive signal x(t) to the associated row of the sensing elements. The detection unit 13 respectively modulates the detection signal y(t) of each row with different two continuous signals $S_1$ and $S_2$ for distinguishing. In addition, the method of identifying the touch event and the touch position are similar to FIG. 5 and thus details thereof are not repeated herein.

In the embodiment of the present disclosure, the detection circuit 13 may further include the filter and/or the amplifier to improve the signal quality. In addition, the processing unit 14 may be integrated with the detection circuit 13.

In the above embodiments, as the phase variation of transmitting signals due to the signal line does not influence the norm of vector of two detection components I, Q of the detection signal y(t), i.e. the above digital components, the influence of the phase difference due to the signal line is eliminated by modulating the detection signal y(t) with two signals in the receiving end. Similarly, if the drive signal itself or the inductive signal from an external device have phase variations, as mentioned above the phase variations in the drive signal or the external inductive signal do not influence the norm of vector of the two detection components of the detection signal so that the identification of the touch event is not affected. Accordingly, in the present disclosure a near field communication is performed based on the phase modulation so as to implement the capacitive touch device, the capacitive communication device and the communication system have both functions of the touch identification and the near field communication.

Figure 7:
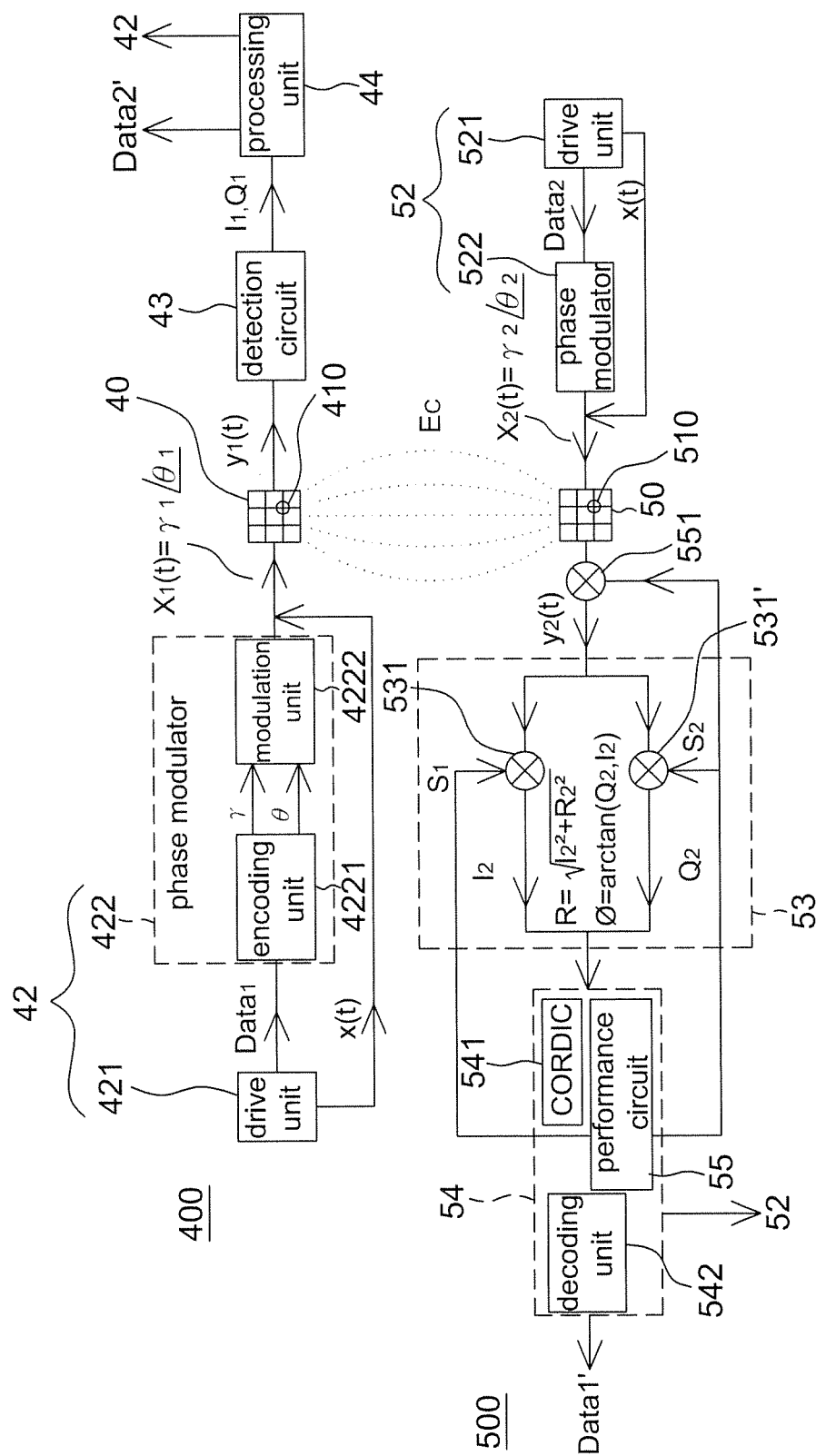
FIG. 7 is a schematic block diagram of a communication system according to one embodiment of the present disclosure.

Referring to FIG. 7, it is a schematic diagram of a communication system according to one embodiment of the present disclosure, which includes a first capacitive touch device 400 and a second capacitive touch device 500. In one embodiment, the first capacitive touch device 400 and the second capacitive touch device 500 are respectively applied to a portable electronic device such as a smart phone, a smart watch, a tablet computer, a personal digital assistance or the like, or applied to a wearable electronic device, and configured to perform a near field communication through the induced electric field coupled between two devices. In another embodiment, one of the first capacitive touch device 400 and the second capacitive touch device 500 is applied to a portable electronic device or a wearable electronic device, and the other one is applied to a home appliance, a security system, an automatic system, a vehicle electronic device or the like, and configured to read relative information of the electronic device or perform a relative control.

The first capacitive touch device 400 includes a touch panel 40, a plurality of drive circuits 42, a detection circuit 43 and a processing unit 44. The second capacitive touch device 500 includes a touch panel 50, a plurality of drive circuits 52, a detection circuit 53 and a processing unit 54. In this embodiment, a near field communication is implemented through the coupling electric field Ec between the touch panel 40 and the touch panel 50. In other words, the touch panel 50 is an external touch panel with respect to the first capacitive touch device 400, and the touch panel 40 is an external touch panel with respect to the second capacitive touch device 500.

Figure 8:
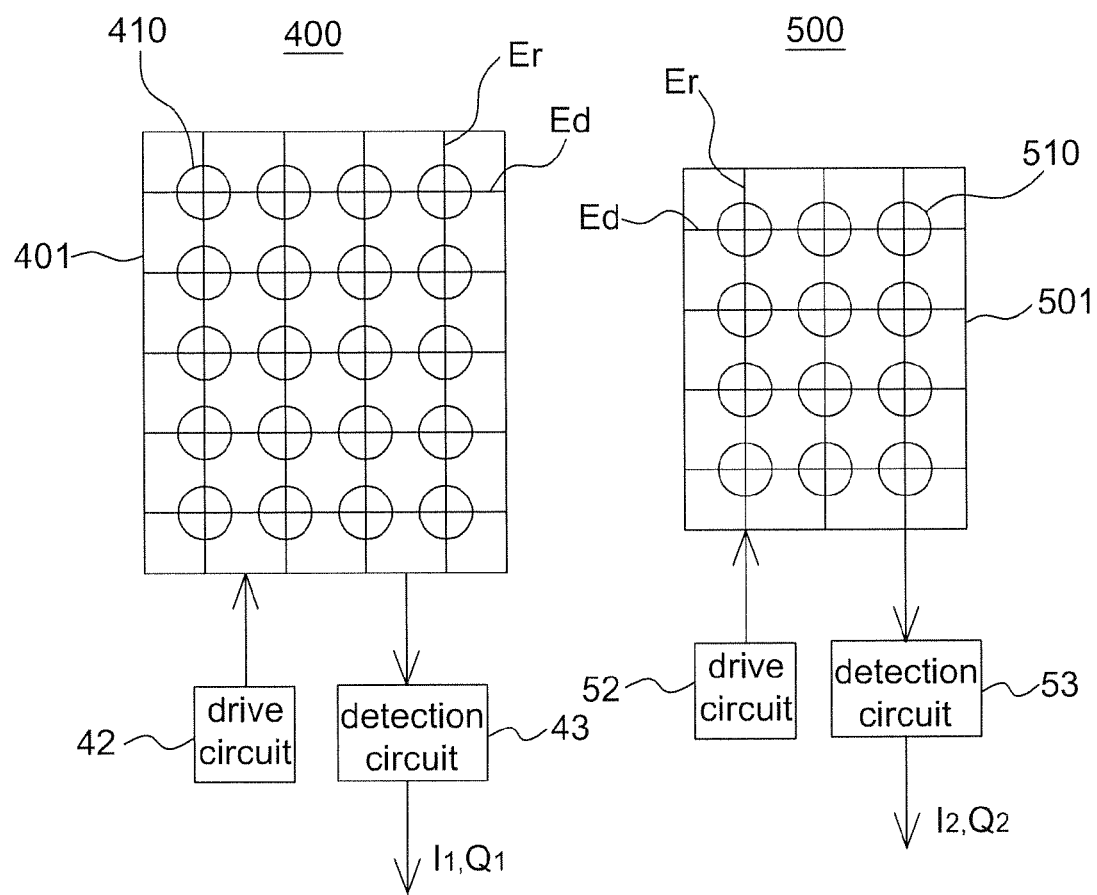
FIG. 8 is another schematic block diagram of a communication system according to one embodiment of the present disclosure.

The touch panel 40 includes a plurality of drive electrodes Ed and a plurality of receiving electrodes Er. As mentioned above, the drive electrodes Ed and the receiving electrodes Er form sensing elements 410 therebetween so as to detect an approaching conductor. As shown in FIG. 8, a touch sensing area 401 of the touch panel 40 includes a plurality of sensing elements 410. When an external touch panel (e.g. the touch panel 50 herein) approaches, the drive electrodes Ed and the receiving electrodes Er further form a coupling electric field Ec with the external touch panel. More specifically, the drive electrodes Ed of the touch panel 40 is configured to form the coupling electric field Ec with at least one receiving electrode of the external touch panel, or the receiving electrodes Er of the touch panel 40 is configured to form the coupling electric field Ec with at least one drive electrode of the external touch panel depending on the function of the touch panel 40, e.g. a transmitting end, a receiving end or a transceiver. Similarly, the touch panel 50 includes a plurality of drive electrodes Ed and a plurality of receiving electrodes Er configured to form a coupling electric field Ec with an external touch panel (e.g. the touch panel 40 herein). As shown in FIG. 8, a touch sensing area 501 of the touch panel 50 includes a plurality of sensing elements 510. It is appreciated that the touch sensing area 401 and the touch sensing area 501 may or may not have identical resolution.

The drive circuits 42 are respectively coupled to the drive electrodes Ed of the touch panel 40 and respectively include a drive unit 421 and a phase modulation unit 422. The drive unit 421 outputs a phase-fixed drive signal x(t) or transmission data Data1, wherein the phase-fixed drive signal x(t) may be the drive signal in a touch detection mode, and the transmission data Data1 is for being sent to an external touch panel in a near field communication mode. The phase-fixed drive signal x(t) may be a continuous or non-continuous signal such as a square wave, sinusoidal wave, triangular wave, trapezoidal wave without particular limitations. In one embodiment, the drive circuits 42 are respectively coupled to the drive electrodes Ed through, for example, a plurality of switching elements (not shown).

The phase modulation unit 422 includes an encoding unit 4221 and a modulation unit 4222. The encoding unit 4221 is configured to encode the transmission data Data1, and the modulation unit 4222 is configured to phase-modulate the encoded transmission data and output the phase-modulated drive signal $X_1(t)=r_1\angle\theta_1$. In one embodiment, the phase-modulated drive signal $X_1(t)$ may be a phase-shift keying (PSK) signal, wherein the PSK signal may be a biphase shift keying (BPSK) signal, a quadrature phase shift keying (QPSK) signal, an 8-PSK signal or a 16-PSK signal, but not limited thereto. In another embodiment, the phase-modulated drive signal $X_1(t)$ may be a differential phase shift keying (DPSK) signal, wherein the DPSK signal may be a differential BPSK (DBPSK) signal, a differential QPSK (DQPSK) signal, a differential 8PSK (D-8PSK) signal or a differential 16PSK (D-16PSK) signal, but not limited thereto.

Similarly, the drive circuits 52 are respectively coupled to the drive electrodes Ed of the touch panel 50. The drive circuits 52 include a drive unit 521 configured to output a phase-fixed drive signal x(t) or transmission data Data2, and a phase modulation unit 522 configured to output a phase-modulated drive signal $X_2(t)=r_2\angle\theta_2$, to the drive electrode Ed coupled thereto. In one embodiment, the drive circuits 52 are respectively coupled to the drive electrodes Ed through, for example, a plurality of switching elements (not shown).

Figure 7A:
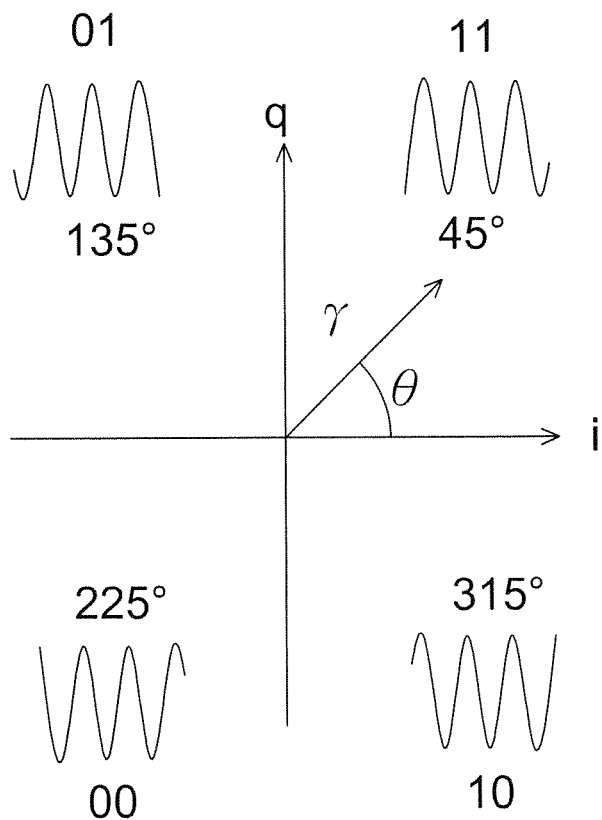
FIG. 7A is a schematic diagram of the QPSK modulation.

For example, FIG. 7A is a schematic diagram of the QPSK modulation. The encoding unit 4221 encodes the transmission data as, for example, four codes 11, 01, 00 and 10, and the modulation unit 4222 outputs the drive signal $X_1(t)=r_1\angle\theta_1$ with four phases 45°, 135°, 225° and 315° respectively according to the encoding of the encoding unit 4221, and the drive signal $X_1(t)$ is inputted to the drive electrodes Ed.

As mentioned above, the receiving electrodes Er of the touch panel 40 are respectively output a detection signal $y_1(t)$ according to the coupling electric field Ec as well as the coupling electric field between drive electrodes and receiving electrodes therein. In the touch detection mode, the detection signal $y_1(t)$ is associated with the drive signal inputted into the touch panel 40. In the near field communication mode, the detection signal $y_1(t)$ is associated with only the drive signal inputted into the touch panel 50 or associated with both the drive signals inputted into the touch panel 40 and the touch panel 50. The receiving electrodes Er of the touch panel 50 are respectively configured to output a detection signal $y_2(t)$ according to the coupling electric field Ec as well as the coupling electric field between drive electrodes and receiving electrodes therein. Similarly, information contained in the detection signal $y_2(t)$ is determined according to a current operating mode of the touch panel 50.

As mentioned above, the detection circuit 43 may be sequentially coupled to the receiving electrodes Er of the touch panel 40 (e.g. as shown in FIG. 5), and modulates the detection signal $y_1(t)$ respectively with two signals to generate two detection components $I_1$, $Q_1$ as shown in FIGS. 3A and 3B. The detection circuit 53 may be sequentially coupled to the receiving electrodes Er of the touch panel 50 (e.g. as shown in FIG. 5), and modulates the detection signal $y_2(t)$ respectively with two signals $S_1$, $S_2$ to generate two detection components $I_1$, $Q_1$. As mentioned above, the detection circuits 43, 53 may further include the integrator configured to integrate the detection signal y(t) and the ADC unit configured to perform the analog-to-digital conversion as shown in FIGS. 3A and 3B.

The processing unit 44 is coupled to the detection circuit 43 and configured to obtain a norm of vector according to the two detection components $I_1$, $Q_1$ to accordingly identify a touch event, wherein as shown in FIG. 4 the processing unit 44 may calculate the norm of vector, which is compared with a threshold TH, by CORDIC. The processing unit 54 is coupled to the detection circuit 53 and configured to obtain a norm of vector according to the two detection components $I_2$, $Q_2$ to accordingly identify a touch event and obtain a phase value according to the two detection components $I_2$, $Q_2$ to accordingly decode transmission data Data1', wherein the transmission data Data1' may totally or partially identical to the transmission data Data1 sent by the first capacitive touch device 400 depending on the bit error rate. In this embodiment, the transmission data Data1' is obtained by calculating an arctan($Q_2$, $I_2$) of the two detection components $I_2$, $Q_2$ by a CORDIC 541 on as to obtain a phase value, and then decoding the phase value by a decoding unit 542. It is appreciated that the decoding unit 542 decodes the phase value corresponding to the encoding of the encoding unit 4221

In addition, in this embodiment in order to decrease the bit error rate, the processing unit 54 may further include a performance circuit 55. The performance circuit 55 includes, for example, an error detector configured to detect the bit error rate and a phase lock loop (PLL) configured to synchronize signals, track an input frequency, or generate a frequency that is a multiple of the input frequency. The phase lock loop includes, for example, a loop oscillator, a voltage control oscillator (VCO) or a numerical control oscillator (NCO), and the output of the performance circuit 55 is feedback to multipliers 531, 531' and 551, wherein the multipliers 531 and 531' are configured to modulate the detection signal $y_2(t)$ with two signals (e.g. $S_1$ and $S_2$ shown in FIG. 7), and the multiplier 551 is configured to feedback the output of the performance circuit 55 to the detection signal $y_2(t)$, e.g. adjusting the gain thereof.

In addition, if the touch panel 40 is also served as the receiving end of a communication system, the processing unit 44 also obtains phase values according to the two detection components $I_1$, $Q_1$ to accordingly decode transmission data Data2', and performs identical processes and has identical functions as the processing unit 54, e.g. further including a performance circuit and a decoding unit, but not limited thereto.

It should be mentioned that the drive circuit 52 of the second capacitive touch device 500 in FIG. 7 may include both a drive unit 521 and a phase modulation unit 522, or include the drive unit 521 without the phase modulation unit 522 depending on the function thereof. For example, if the second capacitive touch device 500 is configured to receive the near field communication data without sending the near field communication data, the drive circuit 52 may include only the drive unit 521 configured to output the phase-fixed drive signal x(t). In addition, in FIG. 7 the detection circuit 43 and the processing unit 44 of the first capacitive touch device 400 may be identical to the detection circuit 53 and the processing unit 54 of the second capacitive touch device 500, and details of the detection circuit 43 and the processing unit 44 are not shown for simplification. In addition, in FIG. 7 the processing unit 44 of the first capacitive touch device 400 may not include the performance circuit and the decoding unit depending on the function thereof. For example, if the first capacitive touch device 400 is configured to identify the touch event without performing the near field communication, only the CORDIC is included and the CORDIC is configured to calculate the norm of vector of the two detection components $I_2$, $Q_2$ but not calculate the phase value accordingly.

More specifically, in the first capacitive touch device 400 and the second capacitive touch device 500, when the function of transmitting the near field transmission data is included, the transmitting end includes the phase modulation unit, otherwise the phase modulation unit may not be included; and when the function of receiving the near field transmission data is included, the receiving end includes the decoding unit (further including the performance circuit in some embodiments) and is configured to calculate the norm of vector and the phase value according to the two detection components, otherwise the receiving end may not include the performance circuit and the decoding unit and is configured to calculate the norm of vector of the two detection components but not to calculate the phase value according to the two detection components.

Figure 9:
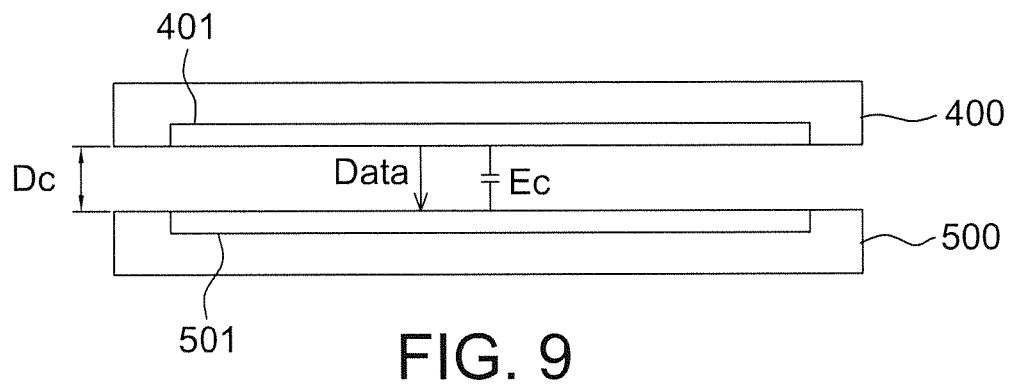
FIG. 9 is an operational schematic diagram of a communication system according to one embodiment of the present disclosure.

For example in one embodiment, the first capacitive touch device 400 is served as a transmitting device of the near field communication and the second capacitive touch device 500 is served as a receiving device of the near field communication. When a distance between the first capacitive touch device 400 and the second capacitive touch device 500 is larger than a near field communication distance Dc (e.g. 10 cm) as shown in FIG. 9, the second capacitive touch device 500 is operated in a touch detection mode and the drive circuit 52 outputs the phase-fixed drive signal x(t). When the drive circuit 52 does not receive a communication enabling signal, the phase-fixed drive signal x(t) is continuously outputted, wherein the communication enabling signal is for enabling the second capacitive touch device 500 to enter a near field communication mode from the touch detection mode.

Figure 10:
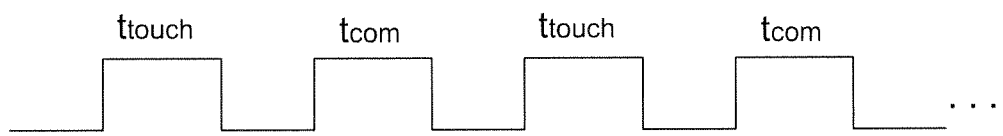
FIG. 10 is an operation sequence diagram of a communication system according to one embodiment of the present disclosure.
Figure 10:
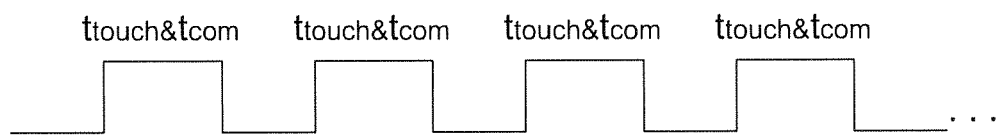

In one embodiment, the second capacitive touch device 500 detects an access code successively or every a predetermined time interval in a synchronization process to accordingly identify whether to enter the near field communication mode, wherein the access code includes, for example, the synchronization word, compensation code and/or device address. In order to detect whether to enter the near field communication mode, the processing unit 54 may calculate the norm of vector and the phase value according to an identical pair of the two detection components $I_2$ and $Q_2$ as shown in the lower part of FIG. 10. As mentioned above, as the phase variation in the detection signal does not influence the norm of vector of the two detection components $I_2$ and $Q_2$, the processing unit 54 may calculate both the norm of vector and the phase value according to the two detection components $I_2$ and $Q_2$ within identical time intervals (e.g. $t_{touch}$&$t_{com}$ in FIG. 10). In another embodiment, the processing unit 54 may alternatively calculate the norm of vector and the phase value according to different pairs of the two detection components $I_2$ and $Q_2$ (e.g. $t_{touch}$ and $t_{com}$ in FIG. 10) as shown in the upper part of FIG. 10.

In the synchronization process, the processing unit 54 is configured to compare a plurality of communication data with a predetermined code sequence (e.g. the access code) so as to confirm whether the synchronization is accomplished, wherein the predetermined code sequence includes, for example, Barker codes which are configured to synchronize phases between the transmitting end and the receiving end, but not limited thereto. The predetermined code sequence may also be other coding used in conventional communication systems. In one embodiment, when the processing unit 54 identifies that a correlation between a plurality of phase values (or transmission data) and the predetermined code sequence exceeds a threshold, it means that the synchronization is accomplished and the processing unit 54 controls the second capacitive touch device 500 to enter the near field communication mode. In another embodiment, when the processing unit 54 identifies that a plurality of phase values (or transmission data) matches a predetermined code sequence (e.g. the access code), it means that the synchronization is accomplished and the processing unit 54 controls the second capacitive touch device 500 to enter the near field communication mode. For example, when the near field communication mode is entered, the processing unit 54 outputs the communication enabling signal to the drive circuit 52 and stops identifying the touch event but only decodes the transmission data. When the drive circuit 52 receives the communication enabling signal, the drive signal is ceased.

In another embodiment, the communication enabling signal is outputted according to a trigger signal of a predetermined application (APP) or a press signal of a button. For example, when an icon shown on a screen of the second capacitive touch device 500 is triggered or a button is pressed, the processing unit 54 receives the trigger signal or the press signal and then outputs the communication enabling signal to the drive circuit 52. Next, the processing unit 54 detects an access code within a synchronization time interval, and when the synchronization is accomplished, the payload, i.e. the transmission data Data1, is received from the first capacitive touch device 400.

In this embodiment, as the first capacitive touch device 400 is served as a transmitting end to communicate with an external electric field, the first capacitive touch device 400 is served as a capacitive communication device. The first capacitive touch device 400 includes at least one drive electrode Ed configured to form the coupling electric field Ec with the external electric field. The drive circuit 42 is configured to output a phase-modulated signal of the predetermined code sequence (i.e. the access code) to the at least one drive electrode Ed of the touch panel 40 to communicate through the coupling electric electrode Ec. For example, the first capacitive touch device 400 may include only one drive electrode Ed to be served as a transmitting antenna so as to form one touch detection point.

In this embodiment, as the second capacitive touch device 500 is served as a receiving end to communicate with an external electric field, the second capacitive touch device 500 is also served as a capacitive communication device. The second capacitive touch device 500 may include at least one receiving electrode Er configured as a receiving antenna to form a coupling electric field Ec with the external electric field, and the receiving electrode Er is configured to output a detection signal $y_2(t)$ according to the coupling electric field Ec.

Figure 11A:
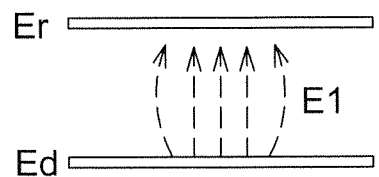
FIGS. 11A-11C are schematic diagrams of the electric field between a drive electrode and a receiving electrode.
Figure 11B:
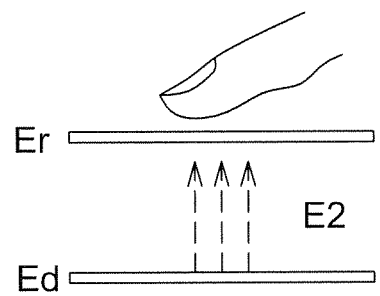
Figure 11C:
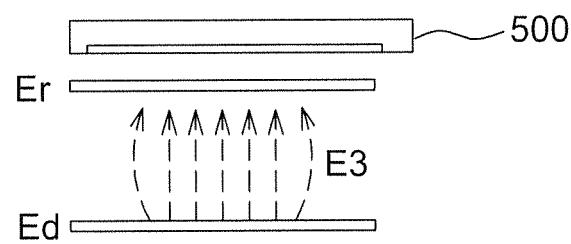

Referring to FIGS. 11A-11C, they are schematic diagrams of the induced electric field between a drive electrode Ed and a receiving electrode Er. According to FIGS. 11A and 11B, when a finger approaches, the induced electric field is weakened, i.e. E2<E1. According to FIGS. 11A and 11C, when an external capacitive touch device 500 approaches, the induced electric field is increased, i.e. E3>E1. Therefore, although in the present disclosure the touch event and the transmission data may be detected at the same time, the threshold TH to be compared with the norm of vector may be different in the touch detection mode and the near field communication mode thereby increasing the accuracy of identifying the touch event. For example, in the near field communication mode, a higher threshold may be used.

Figure 12:
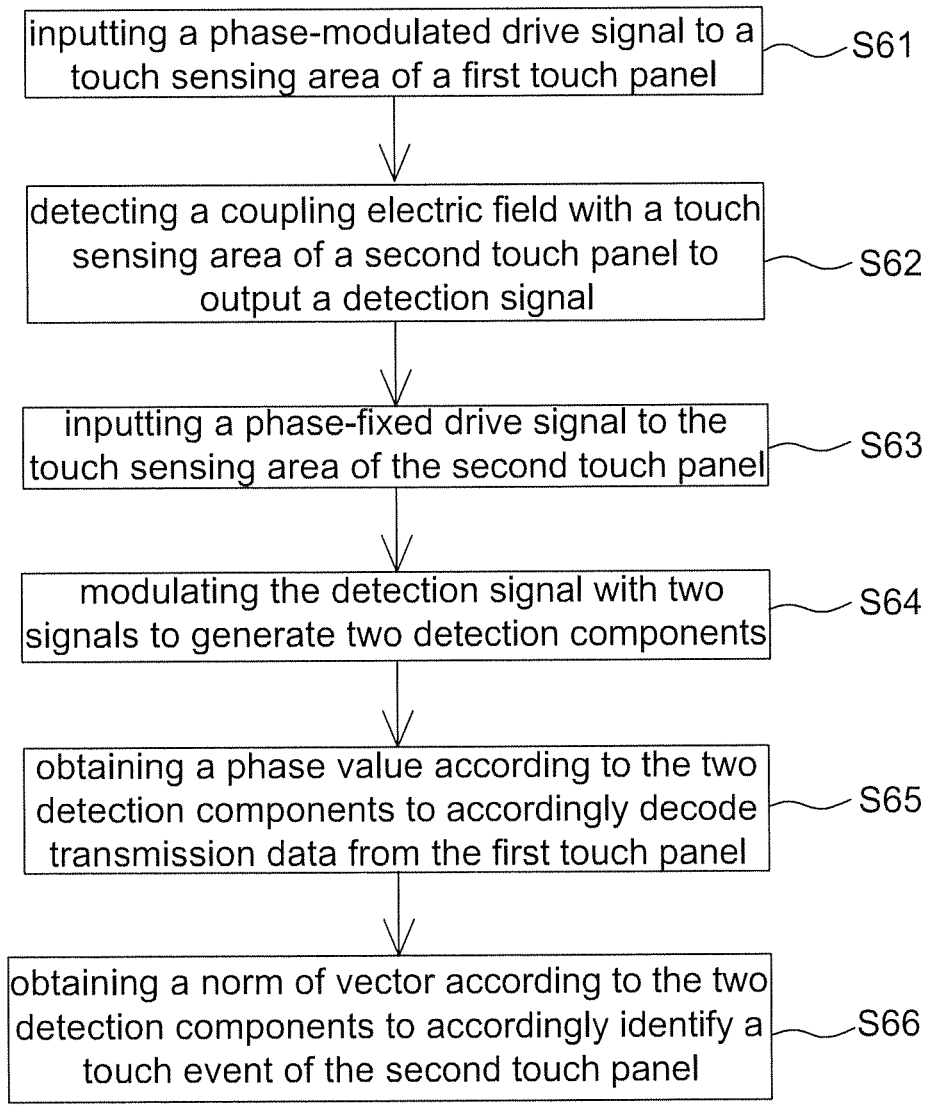
FIG. 12 is a flow chart of a communication method of a communication system according to one embodiment of the present disclosure.

Referring to FIG. 12, it is a flow chart of a communication method of a communication system according to one embodiment of the present disclosure, which includes the steps of: inputting a phase-modulated drive signal to a touch sensing area of a first touch panel (Step $S_{61}$); detecting a coupling electric field with a touch sensing area of a second touch panel to output a detection signal (Step $S_{62}$); inputting a phase-fixed drive signal to the touch sensing area of the second touch panel (Step $S_{63}$); modulating the detection signal respectively with two signals to generate two detection components (Step $S_{64}$); obtaining a phase value according to the two detection components to accordingly decode transmission data from the first touch panel (Step $S_{65}$); and obtaining a norm of vector according to the two detection components to accordingly identify a touch event of the second touch panel (Step $S_{66}$), wherein the Steps $S_{63}$ and $S_{66}$ may not be implemented according to different applications.

Referring to FIGS. 7, 9 and 12, details of this embodiment are illustrated hereinafter.

Step $S_{61}$: When a distance between a first touch panel (e.g. the touch panel 40 herein) and a second touch panel (e.g. the touch panel 50 herein) is smaller than a near field communication distance Dc, the first touch panel 40 enters a near field communication mode. Meanwhile, the drive circuit (e.g. the drive circuit 42 herein) of the first capacitive touch device 400 inputs the phase-modulated drive signal $X_1(t)=r_1\angle\theta_1$ to a touch sensing area 401 of the first touch panel 40. For example, the distance may be identified according to the increment of the electric field as shown in FIG. 11C.

Step $S_{62}$: As a distance between the first touch panel 40 and the second touch panel 50 is smaller than the near field communication distance Dc, a coupling electric field Ec is formed therebetween. A touch sensing area 501 of the second touch panel 50 then outputs a detection signal $y_2(t)$ according to the coupling electric field Ec.

Step $S_{63}$: If the second touch panel 50 does not detect the touch event in the near field communication mode, this step may not be implemented. Otherwise, the drive circuit 52 of the second capacitive touch device 500 outputs a phase-fixed drive signal x(t) to the touch sensing area 501 of the second touch panel 50 such that the detection signal $y_2(t)$ contains the output information of both the drive circuit 42 and the drive circuit 52.

Step $S_{64}$: The detection circuit 53 of the second capacitive touch device 500 modulates the detection signal $y_2(t)$ respectively with two signals (e.g. $S_1$ and $S_2$ shown in FIG. 3A) to generate two detection components $I_2$ and $Q_2$.

Step $S_{65}$: The processing unit 54 of the second capacitive touch device 500 obtains a phase value according to the two detection components $I_2$ and $Q_2$ to accordingly decode transmission data Data1' sent from the first touch panel 40.

Step $S_{66}$: If the second touch panel 50 does not detect the touch event in the near field communication mode, this step may not be implemented. Otherwise, the processing unit 54 of the second capacitive touch device 500 further obtains a norm of vector, which is then compared with at least one threshold (e.g. as shown in FIG. 4), according to the two detection components $I_2$ and $Q_2$ to accordingly identify a touch event of the second touch panel 400.

It should be mentioned that in this embodiment, the first touch panel 40 may also be a receiving end and the second touch panel 50 may also be a transmitting end. It is appreciated that when both the first touch panel 40 and the second touch panel 50 are used to send data, after the synchronization the transmitting interval is further arranged, e.g. transmitting data alternatively.

As mentioned above, the conventional capacitive touch device may only detect an amplitude variation of the detection signal so as to identify whether a touch event occurs. Therefore, the present disclosure further provides a capacitive touch device, a capacitive communication device and a communication system (FIG. 7) that may identify the touch event according to a variation of the norm of vector of two detection components and perform the near field communication according to a phase variation of the two detection components as well. As the two functions do not interfere with each other, the practicality of the capacitive touch device is significantly increased.

Although the disclosure h as been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive touch device, configured to perform a near field communication with an external touch panel, the capacitive touch device comprising:
a touch panel comprising a plurality of drive electrodes and a plurality of receiving electrodes configured to form a coupling electric field with the external touch panel, wherein the receiving electrodes are respectively configured to output a detection signal according to the coupling electric field;
a detection circuit, coupled to one of the receiving electrodes, configured to modulate the detection signal respectively with two signals to generate two detection components; and
a processing unit configured to obtain a norm of vector according to the two detection components to accordingly identify a touch event and obtain a phase value according to the two detection components to accordingly decode transmission data.

2. The capacitive touch device a s claimed in claim 1, further comprising a plurality of drive circuits respectively configured to output a drive signal to the drive electrodes, wherein the drive signal is a phase-fixed drive signal or a phase-modulated drive signal.

3. The capacitive touch device as claimed in claim 1, wherein the two signals are orthogonal to each other.

4. The capacitive touch device as claimed in claim 1, wherein the processing unit is configured to calculate the norm of vector and the phase value according to an identical pair of the two detection components.

5. The capacitive touch device as claimed in claim 1, wherein the processing unit is configured to alternatively calculate the norm of vector and the phase value according to different pairs of the two detection components.

6. The capacitive touch device as claimed in claim 1, wherein the processing unit is configured to decode the transmission data but stop identifying the touch event when identifying that a correlation between a plurality of transmission data and a predetermined code sequence exceeds a threshold.

7. The capacitive touch device as claimed in claim 6, wherein the predetermined code sequence includes Barker codes.

8. The capacitive touch device as claimed in claim 1, wherein the processing unit is configured to decode the transmission data but stop identifying the touch event when identifying that a plurality of transmission data match a predetermined code sequence.

9. A communication system comprising:
a first touch panel; and
a second touch panel comprising:
a plurality of drive electrodes and a plurality of receiving electrodes configured to form a coupling electric field with the first touch panel, wherein the receiving electrodes are respectively configured to output a second detection signal according to the coupling electric field;
a second drive circuit, coupled to one of the drive electrodes, configured to output a phase-fixed drive signal or a phase-modulated drive signal to the drive electrode coupled thereto;
a second detection circuit, coupled the receiving electrode associated with the drive electrode coupled to the second drive circuit, configured to modulate the second detection signal respectively with two signals to generate two detection components; and
a second processing unit configured to obtain a norm of vector according to the two detection components to accordingly identify a touch event.

10. The communication system as claimed in claim 9, wherein the phase-modulated drive signal is a phase shift keying signal or a differential phase shift keying signal, and the two signals have different phases.

11. The communication system as claimed in claim 9, wherein the phase-fixed drive signal is outputted when the second drive circuit does not receive a communication enabling signal, whereas the phase-modulated signal is outputted when the second drive circuit receives the communication enabling signal.

12. The communication system as claimed in claim 11, wherein the second processing unit is configured to output the communication enabling signal to the second drive circuit when receiving a trigger signal of a predetermined application or a press signal of a button.

13. The communication system as claimed in claim 11, wherein the second processing unit is further configured to decode a phase value according to the two detection components, and output the communication enabling signal to the second drive circuit when identifying that a plurality of phase values match a predetermined code sequence.

14. The communication system as claimed in claim 11, wherein the second processing unit is further configured to decode a phase value according to the two detection components, and output the communication enabling signal to the second drive circuit when identifying that a correlation between a plurality of phase values and a predetermined code sequence exceeds a threshold.

15. The communication system as claimed in claim 14, wherein the predetermined code sequence includes Barker codes.

16. The communication system as claimed in claim 14, wherein the first touch panel comprises:
   at least one drive electrode configured to form the coupling electric field with the receiving electrodes of the second touch panel; and
   a first drive circuit configured to output a phase-modulated drive signal of the predetermined code sequence to the at least one drive electrode of the first touch panel.

17. A capacitive communication device, configured to perform a near field communication with an external electric field, the capacitive communication device comprising:
   at least one receiving electrode, configured as a receiving antenna and configured to form a coupling electric field with the external electric field, wherein the receiving electrode is configured to output a detection signal according to the coupling electric field;
   a detection circuit, coupled to the at least one receiving electrode, configured to modulate the detection signal respectively with two signals to generate two detection components; and
   a processing unit configured to obtain a phase value according to the two detection components to accordingly decode transmission data.

18. The capacitive communication device as claimed in claim 17, wherein the processing unit is further configured to perform a synchronization process in which the processing unit is configured to compare a plurality of transmission data with a predetermined code sequence.

19. The capacitive communication device as claimed in claim 18, wherein the predetermined code sequence includes Barker codes.

20. The capacitive communication device as claimed in claim 17, wherein the processing unit is configured to obtain the phase value by calculating an arctangent function of the two detection components, and the two signals have different phases.

* * * * *